(12) United States Patent
Borowski et al.

(10) Patent No.: US 9,077,628 B2
(45) Date of Patent: Jul. 7, 2015

(54) NETWORK DEVICE HAVING A NORMAL OPERATIONAL CONFIGURATION AND FAIL-SAFE CONFIGURATION AND METHOD OF OPERATING THE SAME

(75) Inventors: Olaf Borowski, Rocklin, CA (US); John F. Lino, Spring, TX (US); Lin A. Nease, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1382 days.

(21) Appl. No.: 12/152,552

(22) Filed: May 15, 2008

(65) Prior Publication Data

US 2009/0287951 A1    Nov. 19, 2009

(51) Int. Cl.
*G06F 11/00* (2006.01)
*H04L 12/24* (2006.01)

(52) U.S. Cl.
CPC ........ *H04L 41/0856* (2013.01); *H04L 41/0663* (2013.01); *H04L 41/0806* (2013.01)

(58) Field of Classification Search
CPC ............ H04L 41/0663; H04L 41/0806; H04L 41/0856
USPC .................................. 714/43, 44, 47, 6.3, 36
See application file for complete search history.

(56) References Cited

U.S. PATENT DOCUMENTS

| | | | |
|---|---|---|---|
| 5,708,776 A | | 1/1998 | Kikinis |
| 5,850,515 A | * | 12/1998 | Lo et al. ........................... 714/43 |
| 6,032,271 A | * | 2/2000 | Goodrum et al. ................ 714/56 |
| 6,230,285 B1 | | 5/2001 | Sadowsky et al. |
| 6,560,701 B1 | | 5/2003 | Berstis et al. |
| 6,591,376 B1 | * | 7/2003 | VanRooven et al. ............. 714/36 |
| 6,625,754 B1 | * | 9/2003 | Aguilar et al. ................... 714/15 |
| 6,735,720 B1 | * | 5/2004 | Dunn et al. ...................... 714/43 |
| 6,934,881 B2 | | 8/2005 | Gold et al. |
| 7,039,827 B2 | * | 5/2006 | Meyer et al. ....................... 714/4 |
| 7,107,482 B2 | * | 9/2006 | Murai et al. .................. 714/6.31 |
| 7,111,087 B2 | * | 9/2006 | Jiang et al. ...................... 710/36 |
| 7,131,026 B2 | | 10/2006 | Denninghoff et al. |
| 7,430,686 B1 | * | 9/2008 | Wang et al. ..................... 714/6.3 |
| 7,673,185 B2 | * | 3/2010 | Kalwitz et al. .................. 714/43 |
| 2005/0278581 A1 | * | 12/2005 | Jiang et al. ...................... 714/40 |

* cited by examiner

*Primary Examiner* — Bryce Bonzo
*Assistant Examiner* — Elmira Mehrmanesh
(74) *Attorney, Agent, or Firm* — Greer, Burns & Crain

(57) ABSTRACT

A network device includes multiple ports for accepting network connections, at least one memory for storing a fail-safe device configuration, a normal operational device configuration and one or more triggering events, and one or more processors connected to the memory for controlling the operation of the network device. The processor causes the network device to operate according to the fail-safe configuration in response to the occurrence of a triggering event.

21 Claims, 3 Drawing Sheets

NETWORK DEVICE HAVING A NORMAL OPERATIONAL CONFIGURATION AND FAIL-SAFE CONFIGURATION AND METHOD OF OPERATING THE SAME

BACKGROUND OF THE INVENTION

Generally, a network device includes a memory to contain the device's operating system. Typically, if a network device experiences any kind of failure, the device will reboot to reload its operating system and attempt to resume normal operation. However, for some problems, such as the failure of a module within the device, the device overheating, and the like, a simple reboot may not be sufficient to return the device to operational status.

Traditionally, computer networks are designed to withstand network device failure by virtue of redundancy. That is, one goal in designing a network is that no single network device (or single module of a modular network device) should be the only path to any portion of the network. However, it is not always possible to design a network that achieves this goal. Moreover, while building a network that includes redundant paths is possible, the costs associated with doing so may be unacceptable.

Some network devices incorporate a scripting language, such as TCL, to aid in recovering from device failure. However, the scripts required to take such action are often very complex. Extensive knowledge of the scripting language is required to implement a program that will take appropriate action based on various failure scenarios.

DETAILED DESCRIPTION

Network devices sometimes have a single point of failure. Based on that failure, a network administrator may want to cause the device to operate in a "known good" or fail-safe configuration. Forcing the device to operate in such a configuration will allow the administrator to access the device to diagnose and repair the failure, and allow functioning network devices connected to the network to account for the failed device and reroute network communications as necessary. However, scripting languages are often very complex, making it difficult to create and/or maintain code that will cause the network device to operate in the fail-safe condition after a device failure.

A solution to this problem is to provide a relatively simple method of causing a network device to operate in a fail-safe condition following a device failure. This can be achieved by storing a normal operating configuration, a fail-safe configuration, and one or more triggering events in a memory contained within a network device at the time the network device is initially configured. The network device would then operate according to the normal operating configuration until one of the triggering events occurs. When a triggering event occurs, the device operates according to the fail-safe configuration stored previously. The following is a detailed description of certain embodiments of the invention presently contemplated by the inventors to be the best mode of carrying out the invention.

Figure 1:
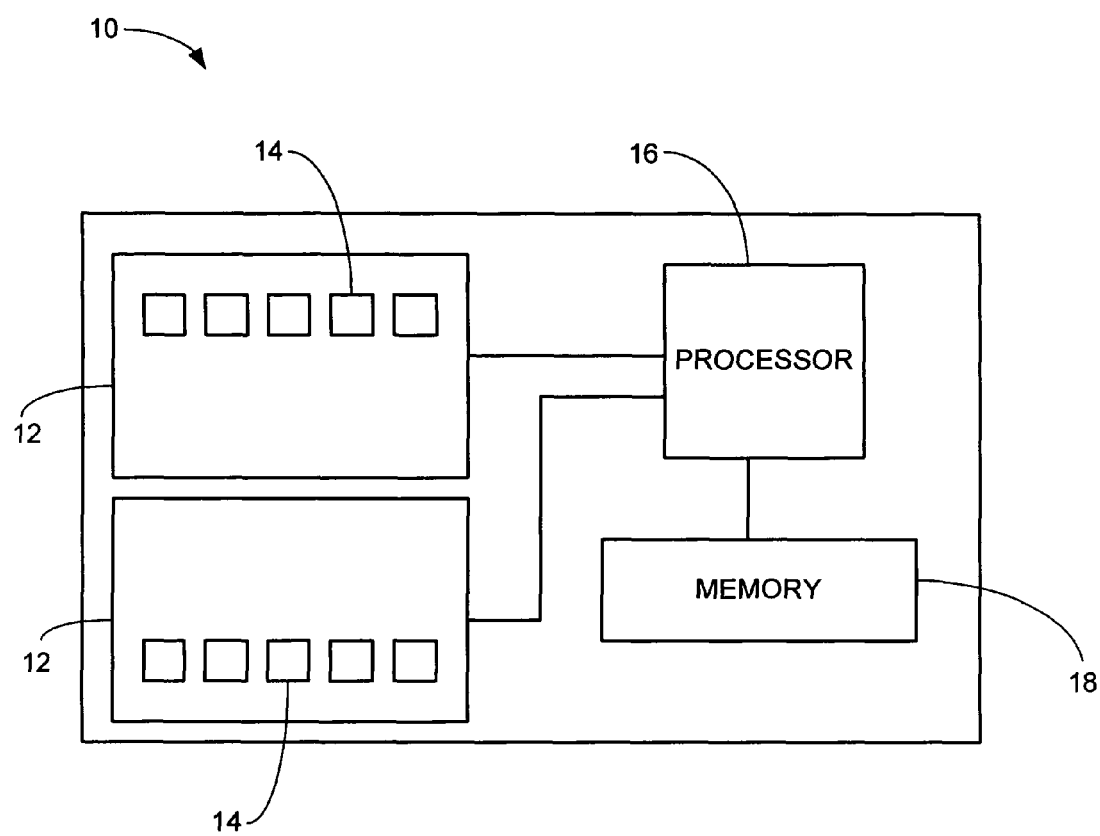
FIG. 1 is a block diagram of a network device according to an embodiment of the present invention.

Referring now to FIG. 1, a network device, designated generally at 10 is shown to include two modules 12 that have multiple ports 14 for connecting to additional network devices. The modules 12 are connected to a processor 16, which is also connected to a memory 18. While the network device 10 shown in FIG. 1 includes two modules, it is contemplated that a device could have more modules or only a single module, if desired.

The memory 18 stores an operating system, a device configuration designated as a normal operating configuration, a device configuration designated as a fail-safe configuration, and at least one triggering event. The operating system includes, a fail-safe device configuring engine, a normal operation configuring engine, and a triggering event configuring engine. The normal operating configuration can be defined by a user during initial device configuration using the normal operation configuring engine It is also contemplated that a default normal operating configuration can be preconfigured at the factory, reducing the setup time required. Similarly, the fail-safe configuration can be configured during initial configuration using the fail-safe device configuring engine, or it can be preconfigured at the factory to reduce setup time. One or more triggering events can also be defined by the user when the network device is initially set up using the triggering event configuring engine, or the triggering events can be predefined to reduce setup time. The memory 18 can be a shared memory unit, or several individual memory units. The memory 18 can be, for example, a non-volatile memory such as a magnetic or optical disk, a ROM, a flash memory, or the like.

The processor 16 executes the operating system and controls the operation of the modules 12. Generally, the processor 16 operates the modules 12 in accordance with the normal operating configuration stored in memory 18. For example, the normal operating configuration may have all of the ports 14 open. However, if any triggering event stored in the memory 18 occurs, the processor 16 operates the device according to the fail-safe configuration. The fail-safe configuration can be any configuration desired by the user. For example, a common fail-safe configuration is to disable a predetermined number of the ports 14, or to disable all ports except for a console port. The fail-safe configuration allows a network administrator to access the device 10 to determine what cause the device to fail, and to make any necessary repairs to the device. Once the administrator has repaired the device, he returns the device to the normal operational configuration.

Triggering events can be defined by a user during initial setup using, for example, a command line interface or a scripting language. By way of example, triggering events may include events such as failure of one of the modules 12 connected to the network device 10, failure of one or more of the ports 14, an operating temperature of the network device that is outside of a predetermined range, or network traffic that exceeds a predetermined threshold. The processor 16 causes the module 12 to operate according to the fail-safe configuration only when one of the defined trigger events occurs.

Figure 2:
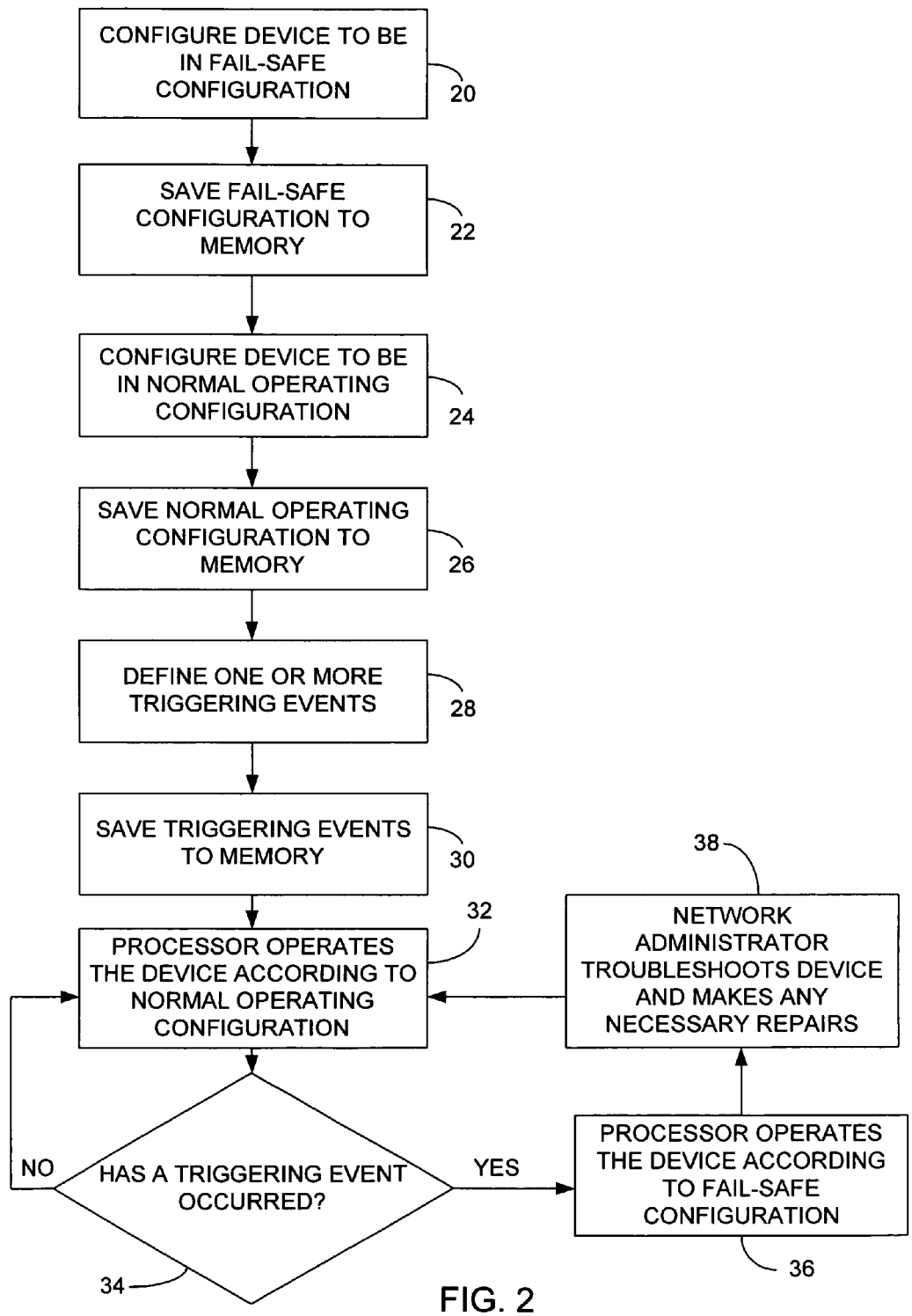
FIG. 2 is a flowchart illustrating an exemplary method of operation of a network device of FIG. 1.

Referring now to FIG. 2, an exemplary method of operating the network device 10 is described. First, in step 20, a user configures the network device to be in a desired fail-safe configuration. Then, in step 22, a fail-safe configuring engine accepts the fail-safe device configuration and stores the configuration in the memory 18.

In step 24, the user configures the network device 10 to be in a desired normal operating configuration. In step 26, a normal operation configuring engine accepts the normal operating configuration created by the user and saves the configuration to memory 18.

In step 28, the user defines one or more triggering events. The triggering events are defined using, for example, a command line interface a simple programming language, or the like. Then, in step 30, a triggering event configuring engine accepts each of the triggering events defined by the user and stores them in the memory 18.

Once the fail-safe configuration, the normal operating configuration, and the triggering events have been stored, initial setup of the network device 10 is complete. In step 32, the processor 16 directs the network device 10 to begin operating according to the normal operational configuration.

In step 34, the processor 16 monitors the status of the network device 10. The device status can be used to determine whether or not any of the defined triggering events have taken place. If no triggering events have taken place, the process returns to step 32, and the network device continues to operate according to the normal operating configuration. On the other hand, if the processor 16 determines that one or more of the triggering events have occurred, the process proceeds to step 36.

In step 36, the processor 16 directs the network device 10 to operate according to the fail-safe device configuration stored in the memory 18. While the device 10 is operating in the fail-safe configuration, in step 38, a network administrator or other user can log in to the network device to determine what caused the device failure (i.e., which of the triggering events occurred), and make any necessary repairs. Once the user is satisfied that the device has been restored to normal operating condition, the user can reset the device, so that it operates according to the normal operating configuration stored in the memory 18 (i.e., the process returns to step 32).

Figure 3:
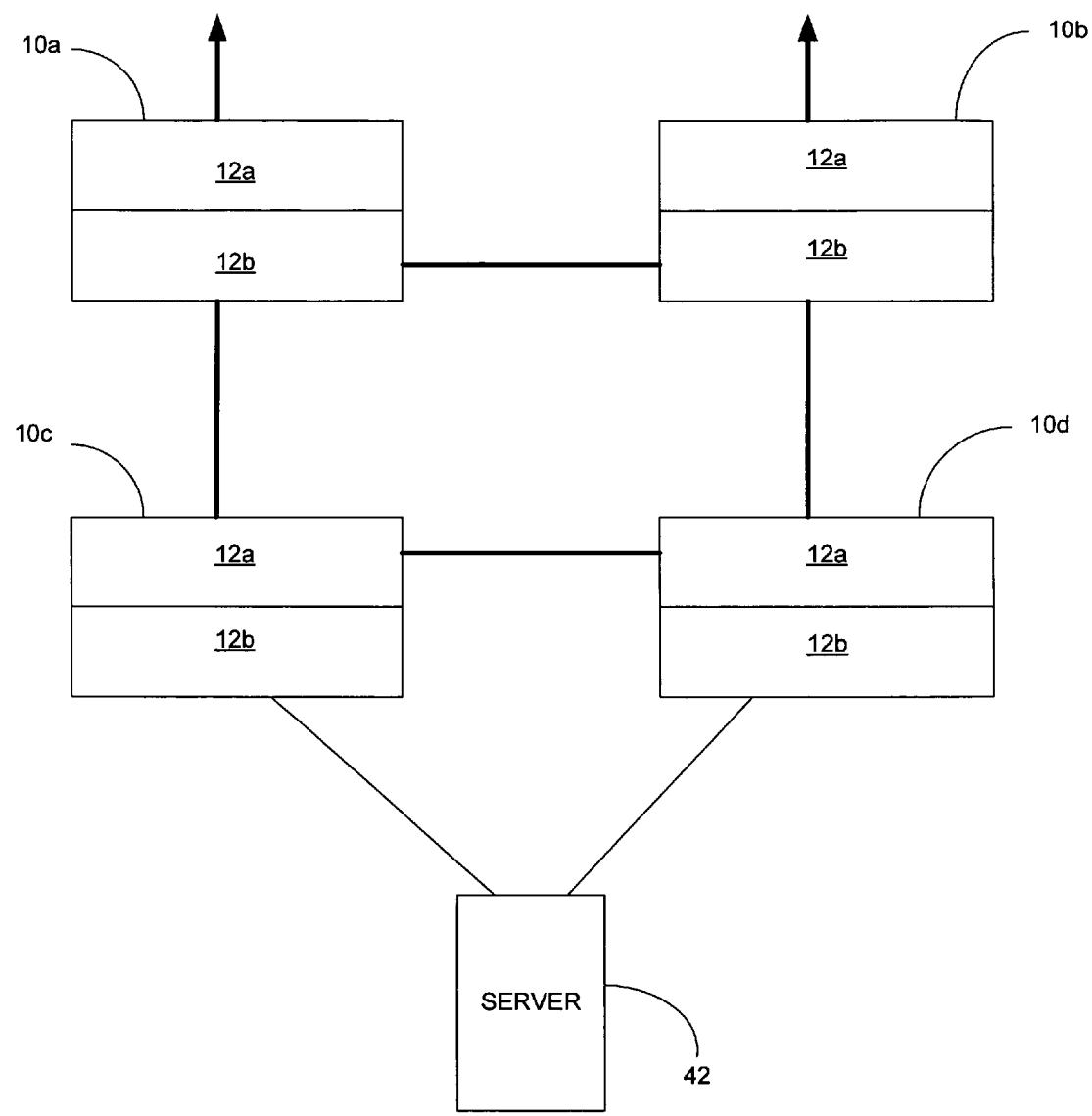
FIG. 3 is a network diagram showing a computer network containing the network device of FIG. 1.

Referring now to FIG. 3, a network 40 containing switches 10a, 10b, 10c, 10d is shown. Each of the switches 10a, 10b, 10c, 10d has two modules 12a, 12b, a memory, and a processor. Additionally, each of the network modules 12a, 12b has a plurality of ports. The network 40 also contains a server 42.

The server 42 is connected to the network 40 in a manner that helps to provide a high level of network availability. Specifically, the server 42 is redundantly connected to switch 10c at module 12b and to switch 10d at module 12b. Module 12a of switch 10c is connected to module 12a of switch 10d. Additionally, module 12a of switch 10c is connected to switch 10a, and module 12 of switch 10d is connected to switch 10b.

In the present example, switch 10d serves as the active switch providing the server 42 with access to the network 40, while switch 10c serves as a backup. If module 12a of switch 10d were to fail, the processor within switch 10d would detect the failure and direct the switch to operate according to the fail-safe configuration stored in memory. When operating according to the fail-safe configuration, all ports other than the console port for switch 10d will be disabled. Accordingly, the connection between the switch 10d and the server 42 will be severed. This will force the server 42 to activate the backup connection to switch 10c, thus allowing the server to continue communicating with the network 40. Additionally, a network administrator or other user can log in to switch 10d through the console port to service the device. Once the administrator has made any necessary repairs to switch 10d, the switch can be returned to its normal operating condition.

While particular embodiments of the invention have been described herein, it will be appreciated by those skilled in the art that changes and modifications may be made without departing from the invention in its broader aspects as set forth in the following claims.

What is claimed is:

1. A network device comprising:
a plurality of ports for accepting network connections with other network devices within a network;
at least one memory for storing a fail-safe device configuration for operation of said network device following any triggering event, a normal operational device configuration for operation of said network device prior to occurrence of any triggering event and an identification of one or more triggering events;
at least one processor connected to the memory in the network device for controlling the operation of the network device according to one of said configurations,
said processor causing the network device to operate according to said fail-safe configuration responsive to an occurrence of a triggering event,
wherein, under said fail-safe configuration, said network device continues operating with communication with said network available via at least one said port so that said network device can be accessed via said network for repair following the occurrence of the triggering event.

2. The network device of claim 1, wherein said fail-safe device configuration disables a predetermined number of said ports.

3. The network device of claim 2 wherein said fail-safe device configuration disables all of said ports except a console port.

4. The network device of claim 1, wherein said one or more triggering events are defined by a user.

5. The network device of claim 1, said triggering events comprising one or more of failure of at least one network device module, failure of one or more of said plurality of ports, an operating temperature of said network device being outside of a predetermined range, and network traffic greater than a predetermined threshold.

6. The network device of claim 1, wherein the network device is a switch.

7. The network device of claim 1, wherein said at least one memory further comprises an operating system for said device in addition to said normal operation device configuration and said fail-safe device configuration.

8. A method of operating a network device having a plurality of network connection ports and at least one memory, the method comprising the steps of:
configuring the network device to be in a fail-safe device configuration under an operating system;
saving said fail-safe device configuration in the memory;
configuring the network device to be in a normal operational device configuration under said operating system;
saving said normal operational device configuration in the memory;
defining one or more triggering events;
saving said one or more triggering events in the memory;
operating the network device according to said normal operational device configuration;
monitoring a status of the network device for an occurrence of a triggering event;
operating the network device according to said fail-safe device configuration responsive to the occurrence of said triggering event,
wherein, under said fail-safe configuration, said network device maintains communication with a network in which said network device is deployed via at least one said port so that said network device can be accessed via said network for repair following the occurrence of a triggering event.

9. The method of claim 8, wherein said fail-safe configuration disables a predetermined number of said ports.

10. The method of claim 9, wherein said fail-safe configuration disables all of said ports except a console port.

11. The method of claim 8, wherein said one or more triggering events are defined using a command line interface.

12. The method of claim 8, wherein said one or more triggering events are defined using a programming language.

13. The method of claim 8, said triggering events comprising one or more of failure of at least one network device module, failure of one or more of said plurality of ports, an operating temperature of said network device being outside of a predetermined range, and network traffic being greater than a predetermined value.

14. The method of claim 8, further comprising a user logging in to the network device to perform maintenance.

15. A network device comprising:
a plurality of ports for accepting network connections;
at least one memory;
at least one processor for controlling operation of the network device;
a fail-safe configuring engine for accepting a fail-safe device configuration and saving said fail-safe device configuration in said memory;
a normal operation configuring engine for accepting a normal operational device configuration and saving said normal operational device configuration in said memory;
a triggering event configuring engine for accepting one or more triggering event definitions and saving said triggering event definitions in said memory;
wherein said fail-safe configuration is a configuration for operating said network device after that same device has experienced a triggering event defined by a triggering event definition, said processor causing the network device to operate according to said fail-safe device configuration responsive to the occurrence of a triggering event;
wherein, under said fail-safe configuration, said network device continues operating with communication with a network available via at least one said port so that said network device can be accessed via said network for repair following the occurrence of a triggering event.

16. The network device of claim 15, wherein said fail-safe configuration engine is part of an operating system of said network device.

17. The network device of claim 15, wherein said fail-safe device configuration disables all of said plurality of ports except a console port.

18. The network device of claim 15, wherein said triggering event configuring engine accepts said triggering event definitions using a command line interface.

19. The network device of claim 15, wherein said triggering event configuring engine accepts said triggering event definitions using a programming language.

20. The network device of claim 15, said triggering event definitions comprising one or more of failure of a network device module, failure of one or more of said plurality of ports, an operating temperature of the network device being outside of a predetermined range, and network traffic exceeding a predetermined threshold.

21. The network device of claim 15, wherein the network device is a switch.

* * * * *